No. 766,425. Patented August 2, 1904.

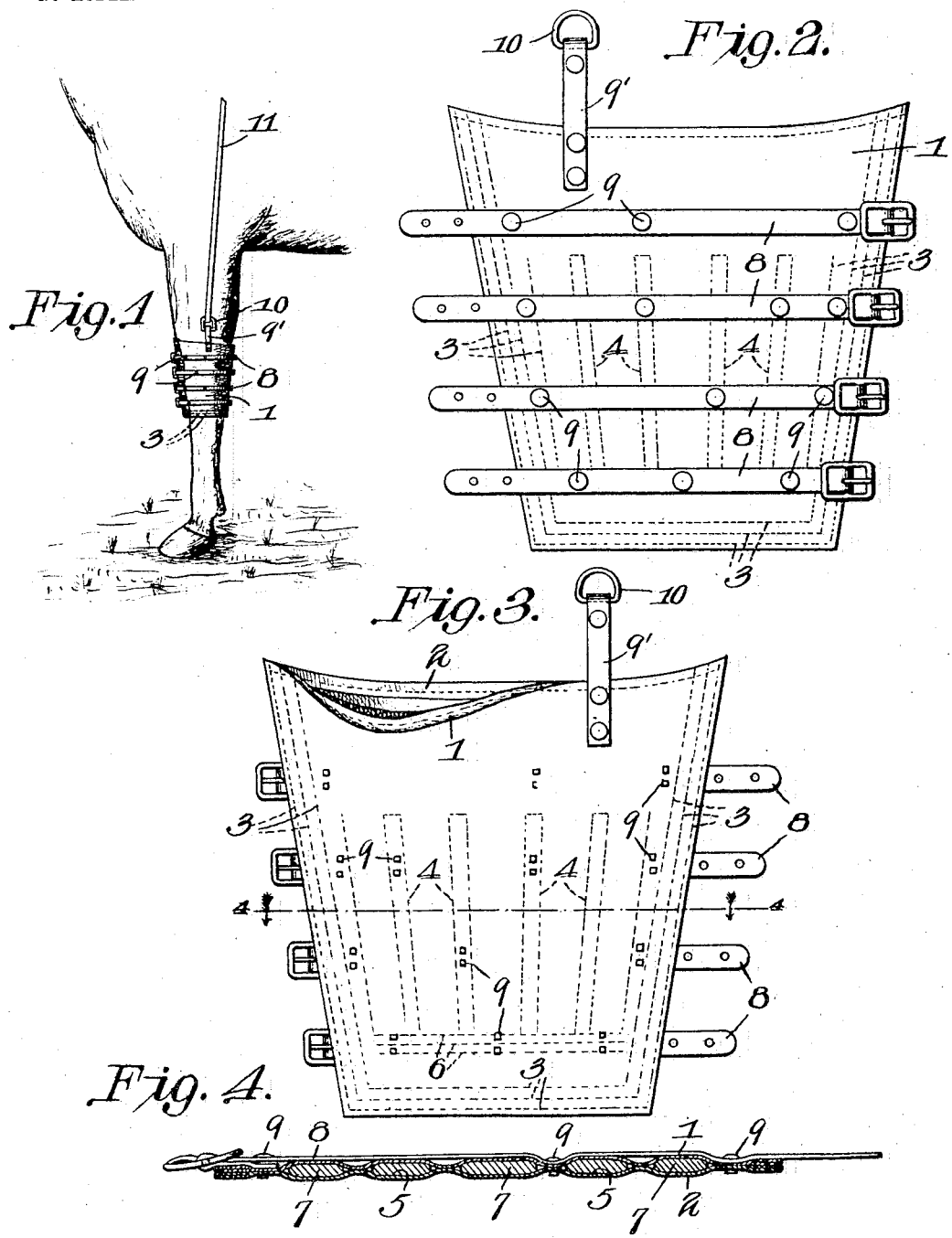

UNITED STATES PATENT OFFICE.

JOSEPH T. COLEMAN, OF MAYFIELD, KENTUCKY.

HOPPLE.

SPECIFICATION forming part of Letters Patent No. 766,425, dated August 2, 1904.

Application filed March 28, 1904. Serial No. 200,435. (No model.)

*To all whom it may concern:*

Be it known that I, JOSEPH T. COLEMAN, a citizen of the United States, residing at Mayfield, in the county of Graves and State of Kentucky, have invented a new and useful Hopple, of which the following is a specification.

This invention relates to that class of devices which are known as "hopples" and which are in the nature of fetters which while not interfering with the moving about of animals to which they are applied will prevent them from running, from jumping over fences, and otherwise straying.

The invention consists in the novel and improved construction, arrangement, and combination of parts, which will be hereinafter fully described, and particularly pointed out in the claims.

In the accompanying drawings has been illustrated a simple and preferred form of embodiment of the invention, it being understood, however, that I do not necessarily limit myself to the precise structural details therein exhibited, but reserve the right to any changes, alterations, and modifications which may be resorted to within the scope of the invention and without departing from the spirit or sacrificing any of the advantages of the same.

In said drawings, Figure 1 is a perspective view showing the hopple applied to the limb of an animal. Fig. 2 is a front view showing the hopple detached. Fig. 3 is a view showing the rear or inner side of the hopple. Fig. 4 is a sectional view taken on the line 4 4 in Fig. 3.

Corresponding parts in the several figures are indicated by similar numerals of reference.

The improved hopple may be constructed of leather, textile material, or any other suitable material or combination of materials, and it comprises in the construction thereof a front piece 1 and a rear piece 2 cut to approximately the same size and shape, the size and shape being regulated by the size of the limb of the animal to which the device is to be applied, it being understood that the device is to form an envelop or wrapper for the knee portion of the limb around which it is to be secured. Hence the general outline of the device will be approximately trapezoidal, as will be seen by reference to Figs. 1 and 2 of the drawings. The front and rear members 1 and 2 are connected along their sides and their lower edges by rows of stitching 3, the upper edges being left disconnected, as will be clearly seen by reference to Fig. 1 of the drawings. When textile material is employed in the manufacture of the device, the edges will be inturned or hemmed. When leather is employed, this is obviously unnecessary.

The front and rear members 1 and 2 are connected by intermediate longitudinal spaced rows of stitching 4 4, forming a plurality of pockets 5 5, the lower ends of which are closed by transverse rows of stitching 6 6. The upper ends of the pockets 5 5 are open and accessible through the disconnected upper ends of the side members 1 and 2. In these pockets are placed splints 7, which may be strips of steel or other resilient metal or which may be simply flat strips of hickory or other suitable tough wood. These splints are intended and adapted to encircle the knee-joint of the animal, which will thereby be fettered and prevented from moving about unrestrainedly, while at the same time the device does not interfere with the moving about of the animal for grazing.

Adjacent pockets 5 5 are separated by at least two rows of stitching 4, the pockets being thus spaced apart in order to admit of the convenient attachment to the front side of the front member 1 of a plurality of buckle-straps 8, which are preferably secured by means of rivets 9, extending through the front and rear members 1 2 at the interspaces between the pockets 5 5. These buckle-straps are obviously for the securement of the device upon the limb of the animal. The device is also provided at the upper edge thereof with a strap 9', having a ring 10 at its upper or free end. This ring is intended or adapted to be connected by a strap 11 or any suitable connecting means with a surcingle or with some suitable harness worn by the animal, this being simply for the purpose of preventing the device after adjustment upon the limb of the animal from sliding down, and thereby defeating the purposes of the invention. The point of attachment of the ring-carrying strap 9' will be such as not to interfere with the placing in position or removal from the pockets 5 of the resilient splints spaced therein.

The operation and advantages of this invention will be readily understood from the foregoing description, taken in connection with the drawings.

The device is extremely simple in construction and may be manufactured at a trifling expense. On the other hand, it will thoroughly and effectively fetter the animal to which it is applied without seriously inconveniencing such animal, but absolutely preventing it from jumping over fences and otherwise straying from its place of confinement.

Having thus described my invention, I claim—

1. A hopple consisting of flexible front and rear members connected along their sides and lower edges and connected intermediately by spaced rows of stitching forming pockets accessible through the disconnected upper edges of said front and rear members.

2. A hopple consisting of flexible front and rear members connected along their sides and lower edges and connected intermediately by spaced rows of stitching forming pockets, and transverse rows of stitching forming closures for the lower ends of said pockets, the latter being accessible through the disconnected upper edges of the front and rear members.

3. A hopple consisting of flexible front and rear members connected along their sides and lower edges and connected intermediately by spaced rows of stitching forming pockets, in combination with splints fitted in said pockets.

4. A hopple consisting of flexible front and rear members connected along their sides and lower edges and connected intermediately by spaced rows of stitching forming pockets spaced apart from each other, in combination with splints seated in said pockets and securing means connected with the device by means extending through the interspaces between the pockets.

5. A hopple consisting of flexible front and rear members connected at their sides and lower edges, and intermediately to form a plurality of pockets, spaced apart from each other, between said front and rear members and accessible through the disconnected upper edges of said front and rear members, securing means connected with the front side of the device by connecting means extending through the interspaces between the pockets, and a ring-carrying strap connected with the upper edge of the device so as not to interfere with the accessibility of the pockets.

In testimony that I claim the foregoing as my own I have hereto affixed my signature in the presence of two witnesses.

JOSEPH T. COLEMAN.

Witnesses:
 C. H. COCHRAN,
 T. J. CROSS.